United States Patent [19]

Deregibus

[11] Patent Number: 4,753,699
[45] Date of Patent: Jun. 28, 1988

[54] METHOD FOR MAKING HOSE

[75] Inventor: Alfio Deregibus, Padova, Italy

[73] Assignee: The Goodyear Tire & Rubber Company, Akron, Ohio

[21] Appl. No.: 643,129

[22] Filed: Aug. 22, 1984

Related U.S. Application Data

[60] Continuation of Ser. No. 501,554, Jun. 10, 1983, abandoned, which is a continuation of Ser. No. 361,955, Mar. 25, 1982, abandoned, which is a continuation of Ser. No. 110,039, Jan. 7, 1980, abandoned, which is a division of Ser. No. 841,858, Oct. 13, 1977, abandoned.

[30] Foreign Application Priority Data

Apr. 5, 1977 [IT] Italy .................. 23156 A/77

[51] Int. Cl.⁴ ............................................. B65H 81/00
[52] U.S. Cl. .................................... 156/195; 156/425; 425/437
[58] Field of Search ............... 156/184, 185, 193, 194, 156/195, 425, 428–432, 171, 173, 175; 242/67.1; 425/437; 422/301

[56] References Cited

U.S. PATENT DOCUMENTS

| | | | |
|---|---|---|---|
| 28,280 | 5/1860 | Mayall | 156/425 |
| 140,934 | 7/1873 | Mayall | 156/425 |
| 1,479,236 | 1/1924 | Heidbrink | 422/301 |
| 1,535,368 | 4/1925 | MacAleese | 425/437 |
| 1,790,582 | 1/1931 | Graham et al. | 242/67.1 R |
| 2,289,777 | 4/1942 | Hayell | 156/259 |
| 2,748,831 | 6/1956 | Nash | 156/432 X |
| 3,121,253 | 2/1964 | Varrial | 156/184 X |
| 3,367,586 | 2/1968 | Eshbaugh | 156/425 X |
| 4,063,838 | 12/1977 | Michael | 156/162 X |

OTHER PUBLICATIONS

"Handbook of Molded & Extruded Rubber", Goodyear Tire & Rubber, 1949, pp. 5–7.

Primary Examiner—David Simmons
Attorney, Agent, or Firm—William A. Drucker; M. R. Dion, Sr.

[57] ABSTRACT

For making hose for industrial use by winding a plurality of tapes helically about an elongated metal surface core, a mass of warm uncured curable rubber compound is converted to continuous running lengths of parallel tapes by calendering, cooling and slitting the same. A multiplicity of bobbins are prepared, each having a substantial length of one of the tapes thereon. The core is supported at suitably spaced intervals along its length. The core is rotated, and at least one of the bobbins is concurrently carried in a direction parallel to the core at a rate commensurate with the helical winding desired. A tape from a first bobbin is wound about the core, and then tape is wound in like manner about the core, one at a time from successive bobbins, to complete the structure of the hose on the core. The core and the hose so constructed are transferred to an autoclave of length accommodating the length of the core, and the hose is cured in the autoclave. Finally, the core and the hose thereon are removed from the autoclave and the hose is stripped from the core, the motions of transferring and removing being effected exclusively perpendicularly of the core.

1 Claim, 1 Drawing Sheet

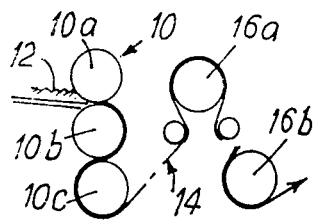
FIG.1
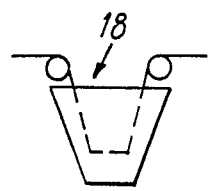
FIG.2A  FIG.2B
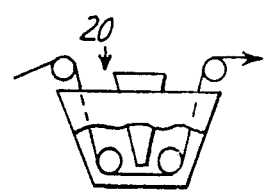
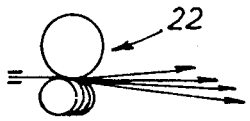
FIG.3A
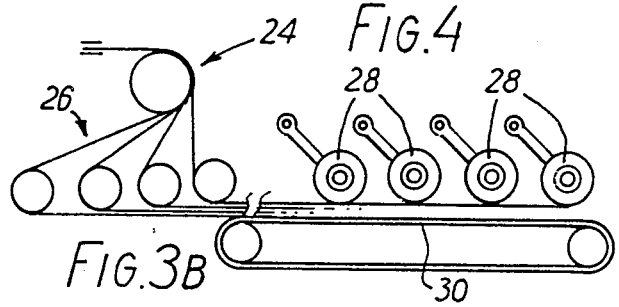
FIG.4
FIG.3B
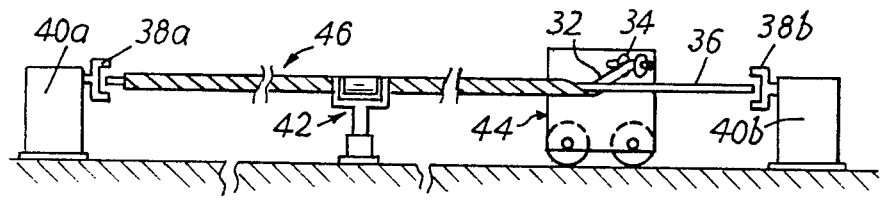
FIG.5A
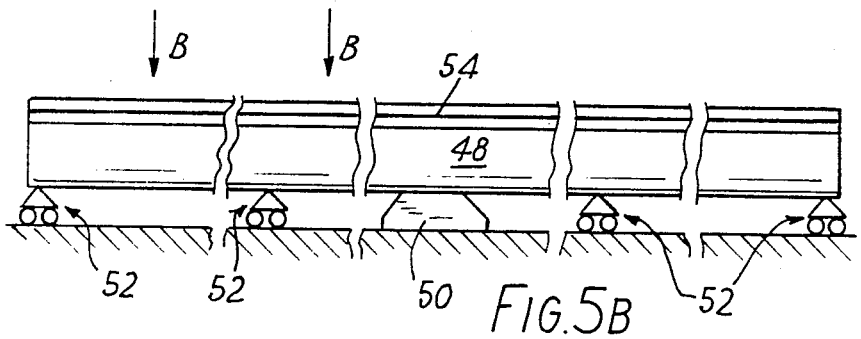
FIG.5B
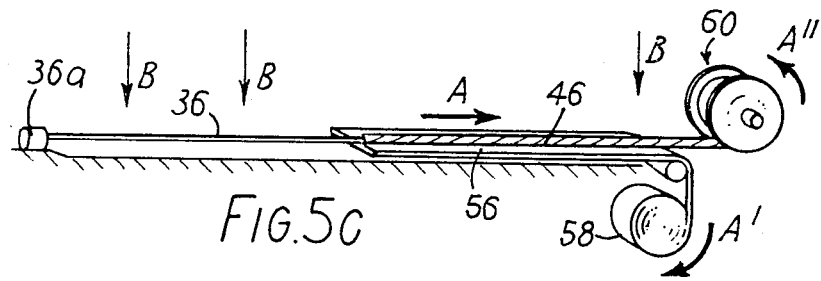
FIG.5C

METHOD FOR MAKING HOSE

This application is a continuation of Ser. No. 501,554, filed June 10, 1983, now abandoned, which is a continuation of Ser. No. 361,955, filed Mar. 25, 1982, now abandoned, which is a continuation of Ser. No. 110,039, filed Jan. 7, 1980, now abandoned, which is a division of Ser. No. 841,858, filed Oct. 13, 1977, now abandoned.

BACKGROUND OF THE INVENTION

1. Field of the Invention

This invention concerns a method for the industrial production of hose of vulcanizable elastomeric material such as natural or synthetic rubber, in particular hose of considerable length, in general at least in the region of 100 meters or more.

2. The Prior Art

It is known in this art to produce such hose by a sequence of steps including (i) the prefabrication of natural or synthetic rubber tapes, some of which are preferably rubberized cloth or otherwise formed by joining a layer of rubber (meaning by this expression, any suitable vulcanizable elastomeric material) to a tape or cloth cushion, (ii) the winding of these tapes after previously reducing a primary tape of considerable width down to single tapes which are individually of widths most convenient for the manufacture of the hose, around metallic cores of a length corresponding to the length of hose desired, (iii) thermal treatment of the partly finished product in an autoclave to carry out its vulcanization, and (iv) the extracting of the core from the length of vulcanized hose.

Obviously, the complete method necessarily includes some complementary stages such as the preliminary application of anti-adhesive, preferably zinc stearate, to the surface of said tapes to prevent mutual adhesion between the windings of the coils into which the tapes are formed.

These principal and complementary stages require observance of particular conditions, in general known to experts in the art and the overcoming of considerable and serious difficulties in connection with the lengths of hose intended to be produced.

On the other hand, the desirability of producing and marketing hose in lengths as a long as possible is well known. It is sufficient to consider, in this regard, the evident advantages consequent upon the reduction in the number of joints to be carried out during the installations of long piping systems, for example, aqueducts, oil pipelines, gas pipelines and the like, and the security of sealing and resistance resulting from the presence of only a small number of joints, with a considerable distance between them, in the installed hose.

The complete procedure can be divided, in general, into two groups of stages, one group including the productive operations leading to the pre-formation of the tapes, wound in coils suitable for helical winding of the tapes around the core, these stages being in their turn essentially independent of the length of hose to be produced, and one group of stages which lead specifically to the production of hoses and their separation from the cores around which they have been assembled and vulcanised. However, the technical solutions needed to resolve the specific problems for the different stages must be compatible, and there exist mutual connections as a result of which the production of the initial partly-finished product (typically, the rubber tapes), must not militate against but rather must favour the assembly of pieces of great length. For example, however much, during the winding, successive lengths of tape can be interconnected, it is at least of great advantage to be able to have at one's disposal coils of tape which unwind perfectly and which include, in their turn, considerable lengths of tape, in such a way as to not jeopardize the regularity of the winding or the assembly of very long pieces of hose.

OBJECT OF THE INVENTION

Essentially, the object of this invention is to provide a method which aims to assure a rational, efficient, industrial manufacture, with a high production yield, for hose of the type indicated, with high and uniform qualitative characteristics.

An embodiment of apparatus, and the manner of its operation in accordance with the invention are hereinafter described with reference to the drawing.

BRIEF DESCRIPTION OF THE DRAWING

In the drawing:

FIG. 1 shows in schematic side view the series of components for the production of a wide rubber tape, with or without a fabric finish;

FIGS. 2A and 2B are respectively side elevations of two different devices for the so-called "talcing" of the tape. By the term "talcing" I mean the application of an anti-adhesive material for rubber, similar to talc but, as it concerns non-vulcanized rubber, preferably composed of zinc stearate. The devices are respectively for (i) the production of a homogeneous tape of vulcanizable rubber, and (ii) for production of a "fabric" tape or a tape produced by coating the rubber on to a cloth;

FIGS. 3A and 3B show in side elevation a device for the longitudinal cutting of wide tape into many narrower tapes individually suited to the assembly of the tubular product by helical winding of the said tapes around the core;

FIG. 4 shows schematically in side elevation a means for the winding of the narrower tapes on to bobbins;

FIGS. 5A, 5B and 5C together represent a characteristic series or "line" for the production of hose of great length, using semi-finished tape-like products preferably but not critically involving the devices of the previous figures. More specifically:

FIG. 5A shows schematically, with parts shown broken away in the longitudinal direction, equipment for the assembly of hose, using said tapes, in pieces of great length.

FIG. 5B similarly represents a linear autoclave of corresponding great length for the vulcanizing treatment of the partly finished tubular products assembled with the equipment of FIG. 5A;

FIG. 5C shows diagrammatically and in perspective a device for the extracting of the tubular product from the core of corresponding great length around which it was assembled and vulcanized.

DESCRIPTION OF THE PREFERRED EMBODIMENTS

With particular references to the figures in the drawing: FIG. 1 schematically represents a device for the production of rubber tapes of practically indefinite lengths. As known in the art, this device comprises a large number of calendaring cylinders 10 including at least a pair of cylinders 10a and 10b between which an amorphous mass 12 of raw rubber is continuously fed, preferably heated beforehand, as are also the said cylinders so as to assure that the raw material treated reaches the physical state most suitable for its calendaring. It is preferable that this large number of cylinders also includes a further cylinder 10c for the completion of the calendaring method step. This step, in the case of the production of tapes in rubberized fabric, also includes the feeding, in the same direction, between cylinders 10b and 10c, of a fabric type (not shown). The laminated material 14 is wound around one or more cooling cylinders 16a and 16b the number of which depends on the intensity of cooling required.

The tape-like material thus produced is then covered with a thin homogeneous layer of anti-adhesive, in particular zinc stearate for raw rubber, or other material of equivalent characteristics of compatability with rubber and with a high covering capacity. This application can be carried out on both surfaces of the tape, for example in a device 18, or else on only one side of the tape, for example in a device 20, as seen in FIGS. 2A and 2B respectively.

As is known, these rubber or rubberized fabric tapes are produced in considerable width, and they must be subdivided by longitudinal cutting in order to obtain narrower tapes, suitable for the manufacture of the hose.

This subdivision can be carried out by means of a cutting device 22 (FIG. 3A) using cutting utensils in the form of discs or fixed knives, or by longitudinal tearing, when rubberized or coated fabrics are involved, by means of a device of the type shown at 24 in FIG. 3B, which includes the starting of the tapes, obtained by tearing, in many directions forming an angle between them, as shown in the drawing at 26.

These tapes are wound into single bobbins 28 (FIG. 4) preferably by means of advancement of the tapes, in parallel, on a conveyor mat 30, which tangentially engages all the bobbins 28 in the course of winding. This technical solution is of particular interest in view of the following method of assembly of hose and pieces of hose of great length, because it permits winding, without substantial tension but with a regular superimposition of the coils, of the bobbins of sufficient size for the uninterrupted carrying out of the winding stage.

FIGS. 5A, 5B and 5C show schematically the components of a line, this term being traditionally used to indicate a large number of items of equipment operating in sequence to bring about production.

The method for the formation or assembly of the tubular products is carried out by helical winding of the tape-like material 32, progressively unwound from one or possibly more bobbins 34, around a core 36 which is slightly longer than the piece of hose to be produced. Characteristically this core 36 is restrained at both ends in mandrels 38a and 38b placed in opposition but in mutual alignment, as well as in conditions of specular symmetry, and driven by motor units 40a and 40b, placed and operating under rigorous conditions of phased synchronism. These mandrels are supported in an axially movable way and are capable of being put further apart so as to impose an elevated state of tension on the core 36. Furthermore the core, as well as the material in the course of winding, is supported at many suitably spaced intervals along its length by support devices 42, in particular involving pairs of rollers, and conveniently adjustable in height, in order to reduce to a minimum the deflections due to the inevitable flexibility of the core of the manufactured article. These conditions are essential and critical in practice, given the great length of the core and especially for the production of hose of relatively small diameter.

As is known, the helical winding is obtained by means of a relative movement, in a direction parallel to the axis of the core, between this latter and the or each bobbin 34. Preferably, this movement is assured by the fact that the bobbin is supported, in rotatable manner, on an axis conveniently oriented manually or preferably mechanically, by a moving trolley or trolleys 44, guided in a strictly parallel direction to the axis of the core 36, by means of suitable motorization, with selectively varying speeds, in order to obtain the necessary concordance with the rotary movement, and also with varying speeds of the core which can be predetermined and preselected.

On completion of the winding, the wound article, predominantly made of rubber which is not yet vulcanized, and schematically shown at 46 is transferred to a treatment autoclave shown schematically in FIG. 5B. For the treatment, obviously it is necessary that the wound material, with the mandrel shall be placed in an autoclave capable of receiving it and, therefore, of at least equal length, with the necessary room for access.

Characteristically, the autoclave is composed of a channel-shaped body, closed at both ends but open at the top along its whole length. This body, indicated at 48, given its large longitudinal dimensions, is obviously subject to dimensional variations, owing to thermal expansion due to the differences in temperature in the course of the treatment cycles. Therefore, the channel-shaped body 48 is supported in a rigid manner at only one point of its length, preferably by means of a support 50 at its centre point, whilst it is supported at a large number of progressively spaced points, by trolleys 52 such as to allow the said expansion.

Another characteristic of the structure and service of this autoclave, which can properly be defined as "linear" is the fact that the containing body is open at the top along its whole length, and is combined with a lid 54, structurally unitary and unitarially raisable, by means of a large number of operating devices, for example, hydraulic or pneumatic jacks, synchronously controlled. Between the mutually opposite marginal parts of the body 48 and the lid 54 there are interposed, sealing strips preferably of deformable tubular material, inside which a pressure is applied.

The production process must necessarily be completed by the removal of the core 36 from the vulcanized article 46. The extraction of the core of such length presents considerable difficulties, even if the core has been previously covered with a suitable detaching agent (such as a silicon emulsion) and if air under pressure is introduced into the product, so as to provoke a certain expansion and consequent physical separation from the core.

These problems have been resolved by placing on the article 46, along its entire length, synchronous and concurrent stresses which tend to impose on it an axial movement relative to the core 36. This is preferably obtained by superimposing the article upon a carpet 56 (or a number of carpets, arranged in succession), whose upper surface is formed by a material possessing a high friction coefficient, for example, rubber grooved in the transverse direction, and by moving the said carpet in a longitudinal direction relative to the core 36. Even though the relative movement could be carried out by the core with respect to the carpet, it is preferable that the core is restrained at its end 36a emerging from the article 46, and there is applied to the carpet 56 of an inextensible material, reinforced for example with metallic threads, a sliding movement in direction A. This movement can be brought about by, for example, progressively winding the carpet 56 in direction A around the drum of a winch. The tubular article 46 is thus under stress at every point and is wound in direction A" around a reel or a bobbin, as shown in the drawing at 60.

The number of components individually shown in FIGS. 5A, 5B and 5C, for a complete plant or production line, will be predetermined depending on the times required for each individual processing and treatment. Given that the vulcanization stage constitutes in practice that which requires the most time, the hollow in the channel-shaped body 48 could be of a size such as to contain, on suitable cradles, a number of articles to be vulcanized at the same time, thus allowing the fullest exploitation of the plant, with contemporaneous and synchronized activity of the various components.

The singling out of the correct sequence and succession of treatment processing is connected to the utilization of means and components, as schematically drawn and briefly described above, in and from which the elements (core 36 and article 46) can be individually applied and removed with movements and shifting in a direction exclusively perpendicular with respect to the axes.

This possibility, also characteristic of the components of the plant, permits the advantageous installation of these components side by side, independent of their number, and the inclusion in the plant of transversal means for carrying and raising of the elements themselves. These movements are schematically indicated by arrows B interposed between FIGS. 5A, 5B and 5C. In practice, the plant could include a large number of carrying and raising devices, of the so-called "bridge crane" type, sliding in a direction perpendicular to the length of the components of the plant, in sufficient number and spaced in the manner necessary for the raising of said elements at points sufficiently close to prevent excessive bending of the raised or carried elements, and provided with winches or raising hoists connected to suitable grasping devices, the sliding trolleys and the hoists all being operated synchronously in such a way that all the raised or carried elements move parallel to one another.

In addition to the rationality and speed of the transfer of the partly finished articles and of the elements from one to another of the components of the plant, there is also obtained a greater exploitation of the area occupied by the entire plant, it also being possible for the different components to be relatively close to each other, installed side by side, obviously leaving between them sufficient space for the movement of means and personnel which attend to their service, inspection and maintenance.

However, given that the method and plant have been described and illustrated in a purely indicative and not limitative example, it is evident that numerous technical equivalent solutions could be adapted for the starting, installation and service of the plant itself and of its single components, and that numerous variations and modifications could be brought about, according to the different requirements of the installation, as well as the production of the considered articles, within the scope of the invention, as defined in the following claims.

I claim:

1. In a method of making extremely elongated lengths of hose for industrial use, wherein a plurality of tapes are wound helically about a metal-surfaced core of such elongation as to require intermediate support, the improvement which comprises in combination:
   (i) preparing a plurality of bobbins each having a substantial length of tape thereon;
   (ii) rotating the core by applying a driving torque from electric motors in phased synchronization at each end of said core, the driving torques being in synchronized relation with each other, and concurrently applying substantial longitudinal tension of said core;
   (iii) winding in like manner about the core the tapes, one at a time, from successive bobbins on a trolley guided for movement parallel to the core and moved therealong at a preselected speed relation to the rotation of the core;
   (iv) transferring said core and the hose thereon by mechanical means into an autoclave of such length as to accommodate the length of said core in non-doubled linear condition;
   (v) curing said hose in said autoclave;
   (vi) removing said core and said cured hose thereon by mechanical means from the autoclave and placing said core and hose on an elongated substantially horizontal non-extensible bearing having a high coefficient of friction relative to the hose;
   (vii) effecting relative movement of the core and of the hose parallel to the common axis of the core and hose by anchoring stationarily an end of the core, injecting air between said hose and core, and moving said bearer, with frictional force being applied between the bearer and the hose simultaneously at every point along the length of that part of the hose which at any moment remains on the bearer, until the hose has been moved axially completely off the core and winding the hose on a reel as it is moved off the core.

* * * * *